Feb. 28, 1967    R. A. FRICKE    3,305,886
WHEEL WASHER
Filed Oct. 20, 1965    6 Sheets-Sheet 1

Inventor
Roy Andrew Fricke
By Wallace, Kinzer and Dorn
Attorneys

Feb. 28, 1967 R. A. FRICKE 3,305,886
WHEEL WASHER
Filed Oct. 20, 1965 6 Sheets-Sheet 2

Inventor
Roy Andrew Fricke
By Wallace, Kinzer and Dorn
Attorneys

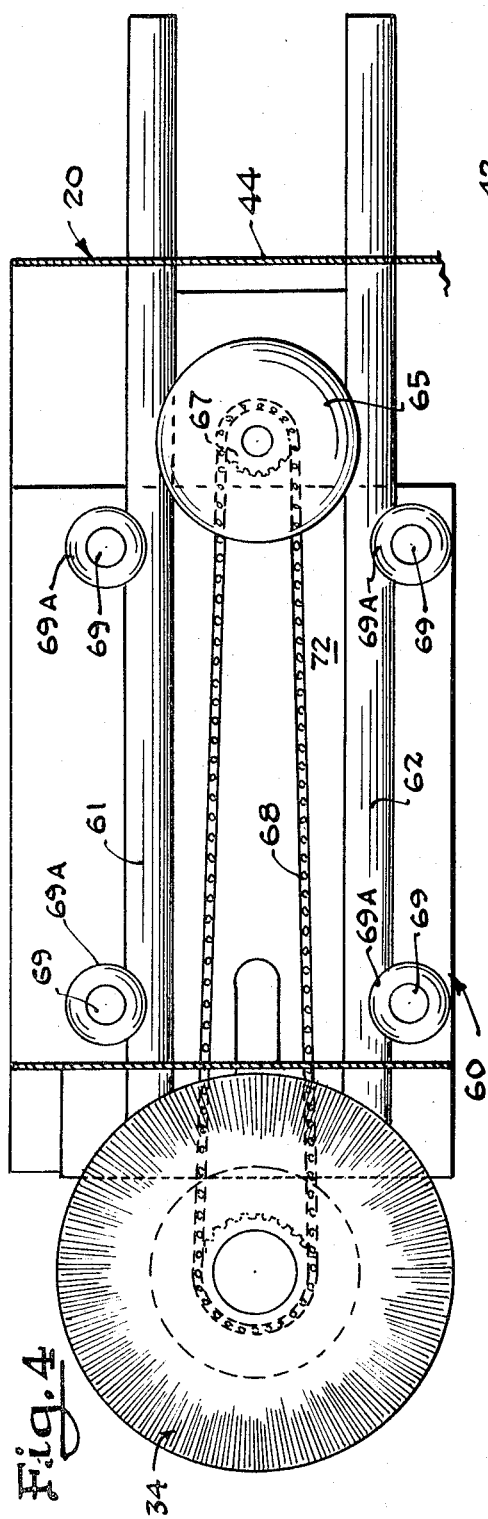

Feb. 28, 1967  R. A. FRICKE  3,305,886
WHEEL WASHER
Filed Oct. 20, 1965  6 Sheets-Sheet 4
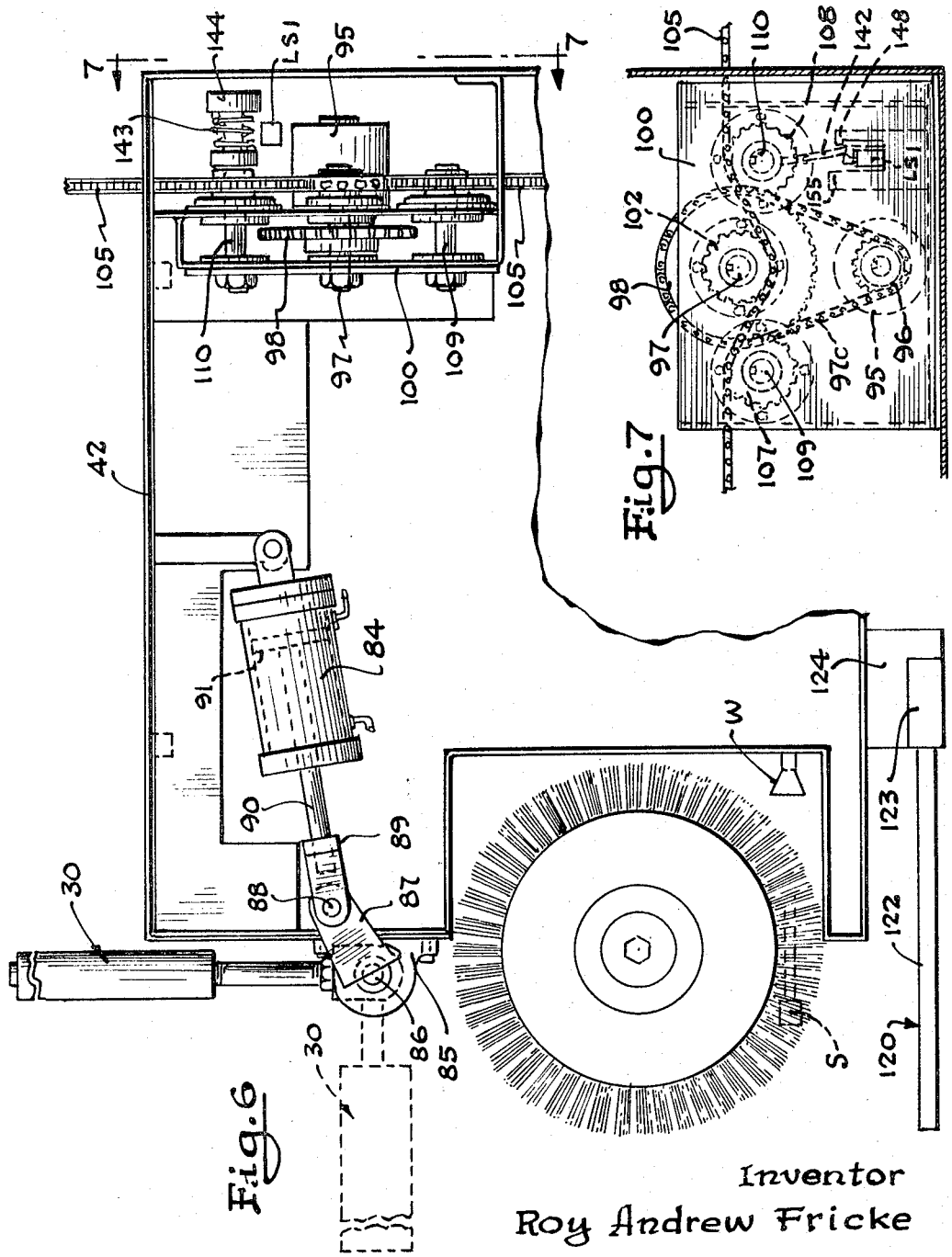
Inventor
Roy Andrew Fricke
By Wallace, Kinzer and Dorn
Attorneys

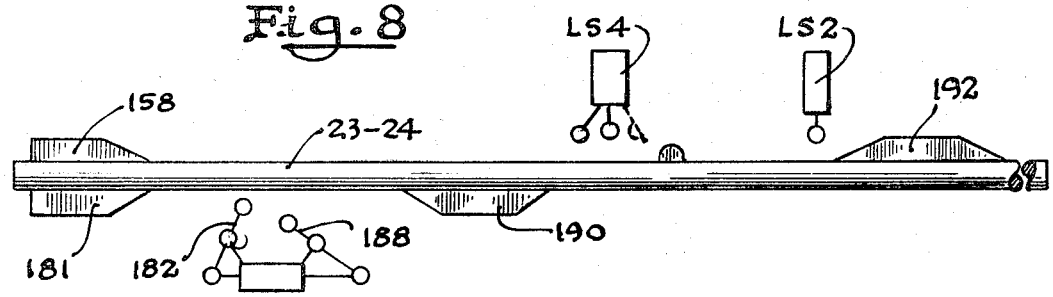
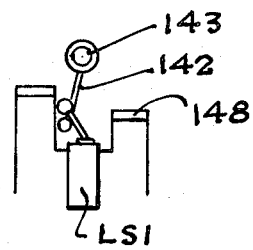
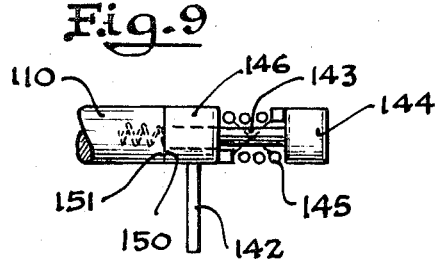
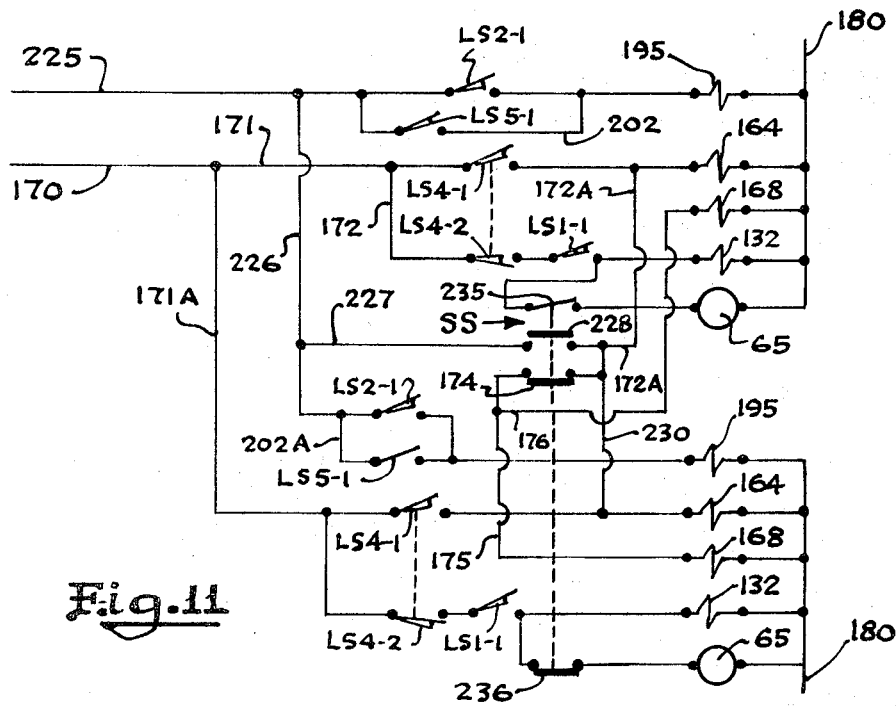

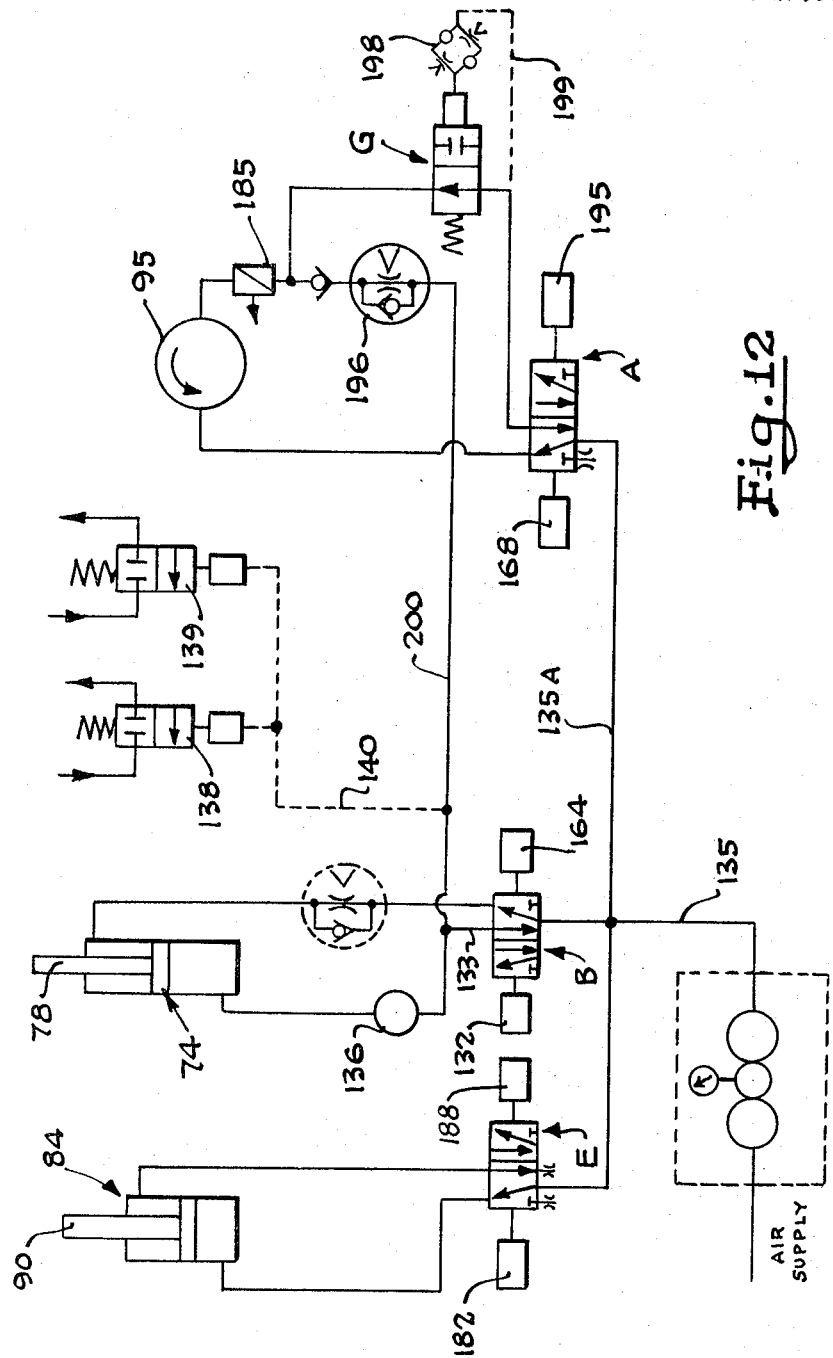

United States Patent Office 3,305,886
Patented Feb. 28, 1967

3,305,886
WHEEL WASHER
Roy Andrew Fricke, Forest Park, Ill., assignor to A. J. Industries, Inc., Los Angeles, Calif., a corporation of West Virginia
Filed Oct. 20, 1965, Ser. No. 498,926
9 Claims. (Cl. 15—21)

This invention relates to wheel washing apparatus and more particularly to apparatus for washing wheels of vehicles such as automobiles, trucks, buses or the like.

The present invention is particularly directed to wheel washing apparatus employing carriages which traverse longitudinal paths beside a vehicle being moved by a conveyor apparatus through a car wash line. As the wheels of the vehicle revolve, wheel washing brushes on the traversing carriages wash the entire circumference of the wheels, usually during one revolution of the wheel. After having washed the wheels, the carriages are reversed and brought back to initial starting position either to wash the rear wheels of the same vehicle or to wash the front wheels of a succeeding vehicle.

Automotive vehicles of commercial manufacture have various sizes of wheel bases and various sizes of track widths, that is, the distance between the respective front wheels or the distance between the respective rear wheels. These differences in wheel bases and track widths of vehicles have presented a number of problems of alignment of wheels and wheel washing brushes and institution of washing cycles for automatic wheel washing apparatus. Accordingly, an object of the present invention is to wash the wheels of vehicles of various wheel bases and of various track widths with automatic wheel washing apparatus having traversing carriages.

Another object of the invention is to detect the car wheels during reverse travel of a wheel washing carriage and to stop the carriage in its reverse movement without considerable impact of the wheels. A further object of the invention is to initiate washing cycles at various and intermediate points along the reverse traversal path of a wheel washing carriage.

Another object of the invention is a new and improved manner of quickly braking the reverse travel of the carriages, and to condition the carriages for forward movement by light pressure of the oncoming wheels of a vehicle. More specifically, and in accordance with a further object of the invention, detection of the wheels causes reversal of an air motor to drive the motor in a reverse direction until the braking action is accomplished at which time the force provided by the air is reduced to below the level needed to propel the wheel washing carriage while still providing the substantial moving force for propelling the carriage in the forward direction.

A further object of the invention is to control vehicle wheel washing apparatus in a simplified manner; and a general object of the invention is a novel vehicle wheel washing apparatus of unique construction and of low cost manufacture.

Other and further objects of the present invention will be apparent from the following description and claims and are illustrated in the accompanying drawings which, by way of illustration, shows preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 4 illustrates the mounting of the brush slide units;

FIG. 5 is a partial sectional view showing the carriage and its brush slide unit;

FIG. 6 is a plan view of a wheel washing carriage;

FIG. 7 is a view taken along the line 7—7 of FIG. 6 and showing the driving sprockets for moving the carriage;

FIG. 8 illustrates the position of cams for mechanically operating limit switches and valves;

FIG. 9 is a fragmentary view of the actuating arm for a limit switch;

FIG. 10 illustrates the limit switch actuated by the apparatus of FIG. 9;

FIG. 11 is a schematic electrical diagram for the respective wheel washing carriages; and FIG. 12 is a pneumatic diagram for the respective carriages.

Figure 1:
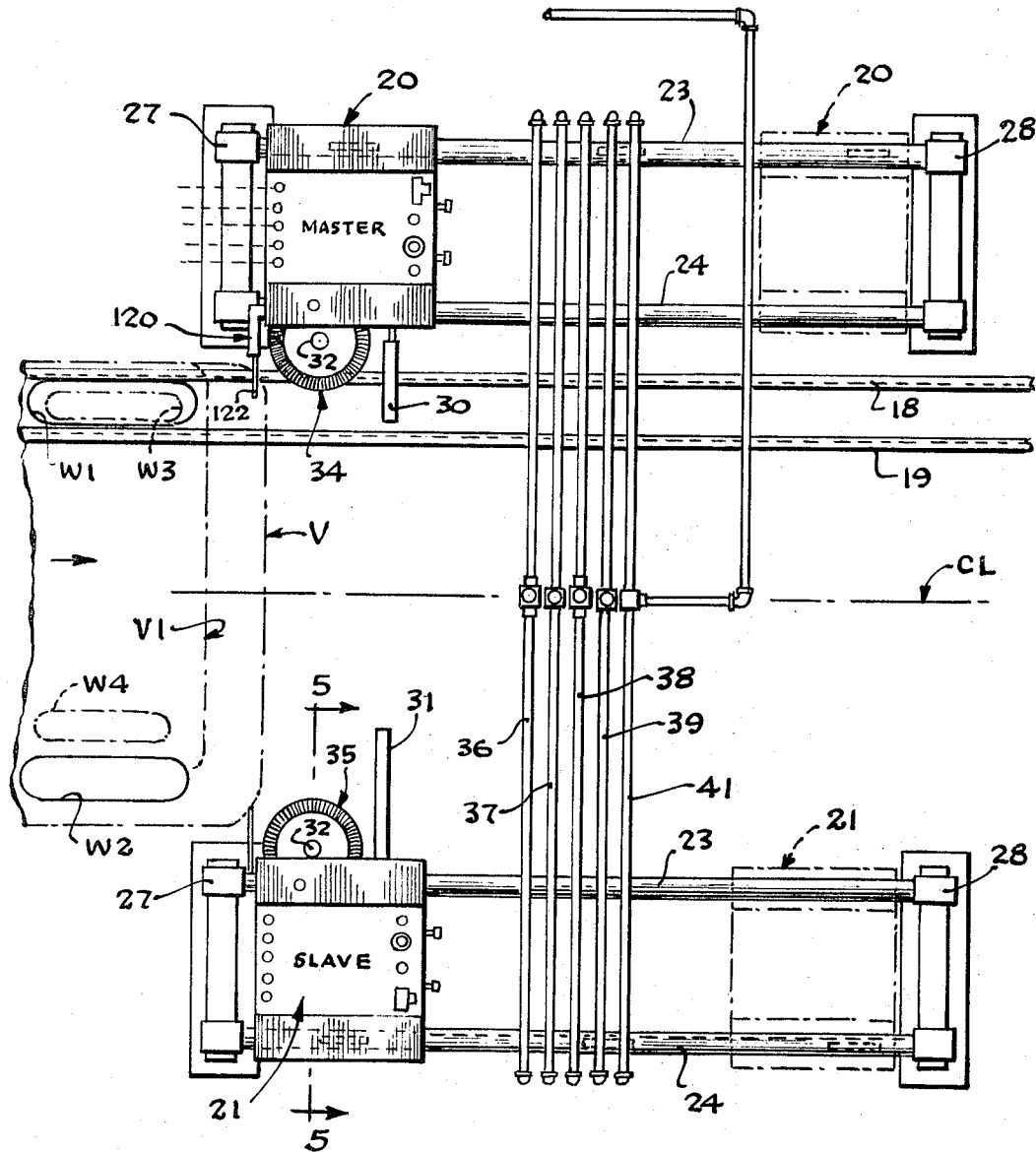
FIG. 1 is a plan view of a wheel washing station having a pair of traveling carriages for washing the wheels of a vehicle and controlled in accordance with the preferred embodiments of the invention.

Referring now to the drawings and more particularly to FIG. 1, there is illustrated a car washing apparatus constructed in accordance with the preferred embodiment of the invention. The wheel washing apparatus is normally employed in conjunction with a car wash line having an automatic conveyor mechanism for moving the car through the wheel washing station. The wheel washing station extends the full length of the traversal of the wheel washing carriages 20 and 21, which move from an initial position, illustrated in solid lines in FIG. 1, to a terminal position, shown in dotted lines at the right hand portion of FIG. 1.

The car wash carriages 20 and 21 are preferably mounted on a pair of parallel guide tubes 23 and 24, which are suitably supported by a pair of upright support brackets 27 and 28. The guide tubes 23 and 24 are generally parallel to the path of the movement of the vehicle V indicated in phantom lines in FIG. 1. The vehicle V is guided for movement through the car wash station between a pair of spaced wheel guide rails 18 and 19 running parallel and longitudinally of the guide tubes 23 and 24 for the carriage 20. The preferred form of conveyor structure is diagrammatically illustrated in FIG. 2, and includes a roller carriage secured to a driving chain C driven by a motor M and in driving connection with a sprocket S. The preferred form of the conveyor diagrammatically illustrated herein is described in detail in copending application Serial No. 372,878, filed June 5, 1964, entitled "Conveyor Structure," now Patent No. 3,260,219.

It should be noted that the wheel W1 to be washed by the apparatus of carriage 20 has a relatively fixed location relative to the center line CL of the car wash station. Hence, the path of travel between guide rails 18 and 19 is fixed with respect to the carriage 20. However, the wheel washed by the carriage 21 may be variously positioned because of the varying width of the cars and distance between the front wheels. For example, the distance between wheels W1 and W2 is considerably greater than the distance between smaller wheels W3 and W4 of another car. Thus, the positions of the wheels W2 and W4 being washed by the carriage 21 vary considerably from the center line CL of the wheel washing station.

The wheel washing apparatus of the present invention is particularly adapted for washing of narrower width cars indicated in dotted lines of FIG. 1, and indicated by the outline V1 with the smaller size wheels W3 and W4.

The wheel washing carriages 20 and 21 are shown in their leftmost or initial positions prior to initiating a wheel washing operation during which operation of the carriages 20 and 21 traverse rightwardly to the dotted line positions which represent the terminal positions. The carriages are then reversed in their direction of movement to move leftwardly toward their initial beginning positions.

It will be appreciated, that vehicles may have different wheel bases, i.e., the distance between front and rear wheels. For example, in FIG. 2, the rear wheel W5 of a very short wheel base vehicle is at the position corresponding to where the carriage 20 is at its rearward position while the front wheel W3 is already positioned opposite the forward position of the carriage 20 shown in phantom lines. Heretofore, with prior art wheel washing devices having traversing carriages, considerable difficulty has been experienced in controlling and stopping movement of the carriages in a reverse direction and aligning the carriages for washing the rear wheels of the smaller wheel base vehicles. Also, those prior art carriages engaged by and moved by the vehicle wheels have occasionally struck the oncoming wheels with considerable force as the carriages attempted to complete their full reverse movement to the initial position.

The carriages 20 and 21 also are adapted to be moved by the wheels of a vehicle, and for this purpose, have wheel engaging arms 30 and 31, which are adapted to be extended outwardly into the path of movement of the respective vehicle wheels to be engaged by the wheels. As will be explained in greater detail hereinafter, the respective carriages 20 and 21 receive about 98 percent of their forward moving force from a motor within the respective carriages 20 and 21 and receive only about 2 percent of the moving force from the wheels of the vehicle as it is being pulled by the conveyor through the wheel washing station. Because the propelling force from the vehicle wheels is necessary to move the carriages forwardly, the carriages 20 and 21 move in synchronism with the vehicle. Therefore, when the vehicle and conveyor stop moving, the wheel washing carriages 20 and 21 also stop moving.

Figure 3:
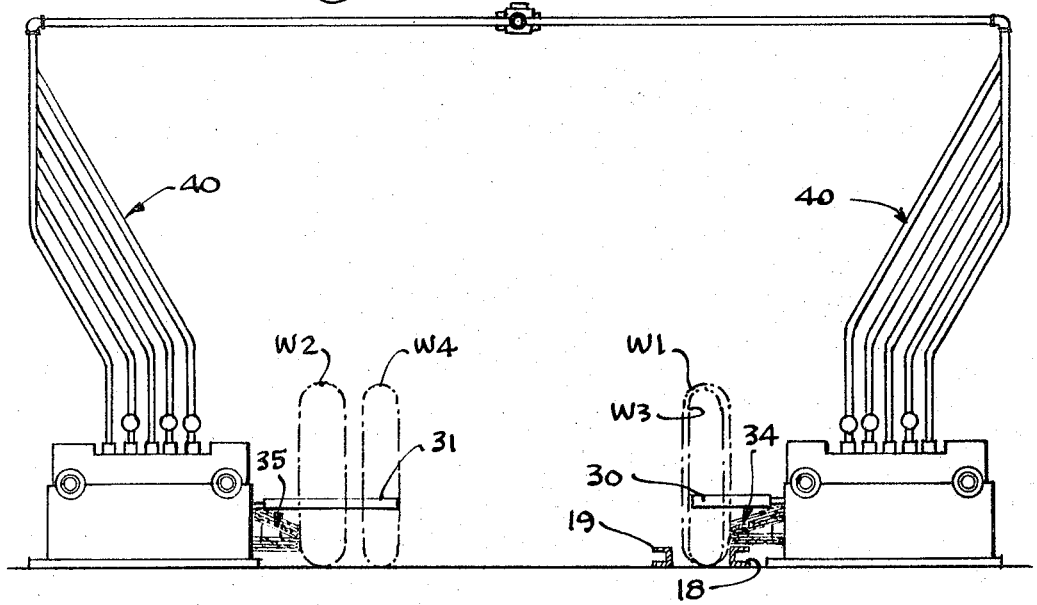
FIG. 3 is a front elevational view of the wheel washing station.

The wheel arms 30 and 31 are spaced forwardly of their respective brush slide units 34 and 35, carrying brushes 54 and 55. Overhead conduits 37 and 39 carry steam and water respectively through respectively flexible conduits 40, FIG. 3, and discharge steam and water into the bristles of the brushes 54 and 55 as the wheels are being washed. A further overhead conduit 36, FIG. 1, is also connected to the respective ones of the flexible conduits and supplies electrical power for driving electric motors, which turn the respective brushes to wash the wheels, as will be explained in greater detail hereinafter. An air conduit line 41 supplies air to the respective carriages to drive an air motor, which supplies 98 percent of the power for driving the carriages in their forward direction and which supplies all of the power for driving the carriages 20 and 21 in their reverse direction. A final conduit 36 serves for electrical control connections for controlling operation of the wheel washing cycle as will be explained hereinafter.

Referring now to FIGS. 4 and 5, there is illustrated the carriage 20, the carriage 21 being substantially identical in operation and configuration; hence carriage 21 is not shown or described in detail. The carriage 21 preferably provides for a longer movement of its brush slide unit 35 to reach the wheels of vehicles having a narrow track width.

Basically, the carriages 20 illustrated in FIGS. 4 and 5, includes a sheet metal frame or housing 42, having an inboard vertical wall 43 and an outboard vertical wall 44, FIG. 5. Suitably secured to the respective vertical walls 43 and 44 is a supporting shaft 45 on which are disposed a pair of rollers 50 and 51. The rollers 50 and 51 have a peripheral surface of a concave contour which is in engagement with the cylindrical guide tubes 23 and 24. The guide rollers 50 and 51 thus roll along the guide tubes 23 and 24 during reciprocation of the carriage 21.

The brush slide unit 34 for the carriage 20 includes a pair of spaced annular brushes 54 and 55, FIG. 5. The lower annular brush 55 is disposed to rotate on a vertical axis 56. The upper brush 54 is inclined with respect to the generally horizontal brush 55 at about an angle of 10° to the horizontal and rotates about an inclined vertical axis 57, FIG. 5. Disposed between the two brushes 54 and 55 is a housing and driving unit 58 which includes a beveled drive gear arrangement similar to that shown in copending application Serial No. 340,889, filed January 29, 1964, now Patent No. 3,208,089.

The brush slide unit 34 includes a transverse slide or carriage 60, FIG. 4, which includes a pair of spaced tubular members 61 and 62 which are connected at their inboard ends to the drive and housing member 58 for the brush unit 34. At their outboard ends, the tubular members 61 and 62 are secured to and spanned by a motor housing and support plate 64, FIG. 5.

The motor 65 is preferably an electric motor disposed in a generally vertical orientation having a sprocket 67 at the lower end thereof for driving a chain 68 which, in turn, drives the beveled gear assembly within the housing 58. Preferably, the driving chain 68 for the brush unit is enclosed between upper and lower sheet metal plates 71 and 72 extending between the tubular members 61 and 62.

It is to be noted that the tubular members 61 and 62 are relatively long members and extend outwardly through the outboard wall 44 of the carriage housing. These long tubular members 61 and 62 are particularly employed for the carriage 21 which must move its brush slide unit 35 a greater distance from the carriage housing 42 towards the center line CL, FIG. 1, for the shorter width cars. To guide and hold the brush slide unit 35 in this cantilever, outward position for washing the wheels of small width cars, the tubular members 61 and 62 are each respectively engaged at spaced locations by pairs of guiding and supporting rollers 69A secured by studs 69 to the base plate 70 of the housing or frame 42 for the carriage. Spacers 73 hold the rollers 69A in a predetermined height above the base plate 70.

For the purpose of reciprocating the brush slide unit 34, fluid cylinder means 74, FIG. 5, is connected at its rearward end by a pivot pin 75 to a bracket 76 secured to a portion of the housing frame means 42. The forward end of the cylinder 74 has a piston rod 78 threaded into locking nuts 79 on opposite sides of a dependent member 80, which extends downward from the slide unit 34. In a conventional manner, fluid under pressure, usually air, is directed to the side of the piston (not shown) in the air cylinder means 74 to drive the slide unit 34 outwardly to engage the brushes 54 and 55 with a wheel. Conversely, the fluid under pressure is directed to the left side of the piston within the fluid cylinder means 74 to drive the piston and piston rod 78 rightwardly to retract the slide unit 34 rightwardly with the tubular members 61 and 62 moving along the spaced rollers 69A.

Also disposed within the housing 42 of the slide unit 34 is the arm actuating cylinder means 84, FIG. 6, which serves to pivot the wheel engaging arm 30 between its inoperative position, illustrated in full lines in FIG. 6 and its operative position, illustrated in dotted lines in FIG. 6. A bracket 85 is secured to the inboard wall 43 of the frame and housing means 42 and has a vertically oriented pivot pin 86 for pivotally mounting the wheel engaging arm 30. Secured to the arm 30 is an actuating arm 87. A pin 88 pivotally connects the actuating arm 87 to a clevis 89 secured on the outer end of a piston rod 90.

Entrance of fluid under pressure into the left side of the cylinder means 84 drives the piston 91 rightwardly to move the arm 30 to its retracted and inoperative position free of the path of the vehicle wheel, which has just been washed. After the wheel has passed the arm 30, fluid under pressure is directed to the right side of the piston 91 forcing the piston rod 90 outwardly of the cylinder causing a counterclockwise rotation of the wheel engaging arm 30 to bring the wheel engaging arm into the operative wheel engaging position, the dotted line position shown in FIG. 6.

Figure 2:
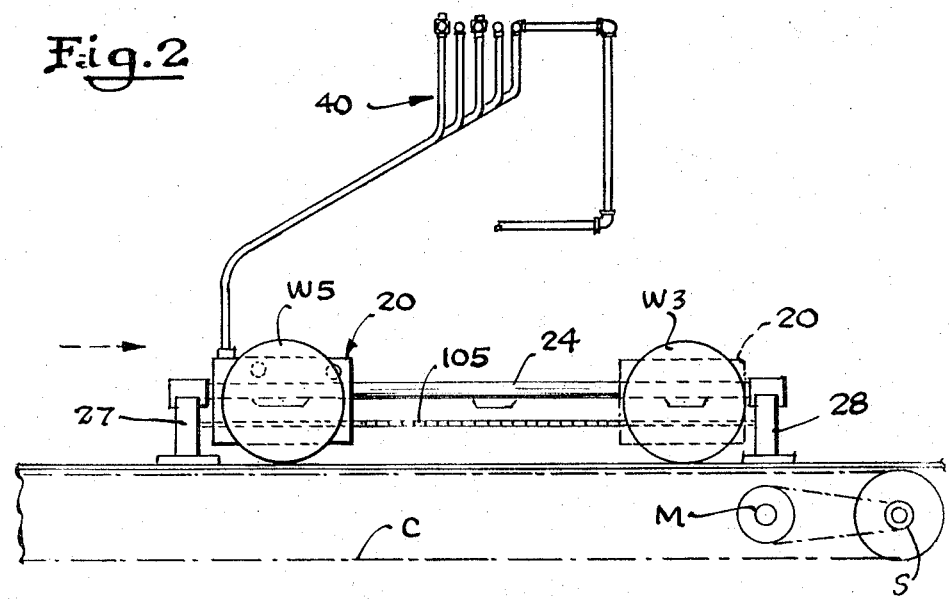
FIG. 2 is a diagrammatic elevational view of the wheel washing station.

For the purpose of driving the respective carriages 20 and 21, a motor means, preferably an air motor 95, FIGS. 6 and 7, is also suitably supported within the housing and frame means 42. The air motor 95 has a driving sprocket 96 in driving engagement with a drive chain 97c which is entrained about a large driving sprocket 98 secured to a rotatable shaft 97 which in turn is secured in a vertical supporting plate 100. Also secured to the rotatable shaft 97 is a smaller driving sprocket 102, which is in engagement with a stationary chain 105. As the smaller sprocket 102 turns over the links of the fixed chain 105, the carriage is propelled. The chain 105 is wrapped about the underside of the small driving sprocket 102 by means of a pair of idler sprockets 107 and 108 suitably supported on shafts 109 and 110, respectively. The fixed chain 105 is suitably secured between the end standards 27 and 28, as best seen in FIG. 2. Thus, the driving force generated by the motor 95 may be applied over the full length of travel of the carriage 20.

Each of the carriages 20 and 21 carries a probing or sensing means 120 for detection of car wheels particularly during the return movement of the carriage 20 or 21. The sensing means 120 performs an important function or aspect of the present invention, which is that of sensing the rear wheels of a short wheel base vehicle and of stopping movement of the respective carriages 20 and 21 prior to returning to the initial position or prior to the engagement of the arms 30 with the wheels of the vehicle. It will be appareciated that with prior art apparatus lacking such a sensing means, the carriage may be moving in an opposite direction to that of the vehicle and its wheel engaging arm would engage the wheels with considerable force.

The sensing means 120 includes a sensing finger or element in the form of an elongated spring member 122, FIG. 6, which is adapted to be engaged and flexed by a vehicle wheel to actuate a microswitch 123, FIG. 6, secured by a suitable bracket to the housing 124. The microswitch 123 is adapted to cause braking of the return travel of the respective carriages 20 and 21 prior to the engagement of the vehicle with the respective wheel engaging arm 30 or 31. It is preferred practice that the carriage 20 or 21 not only be stopped, but that a forward driving force equivalent to about 98 percent of the force needed to move a carriage 20 or 21 forwardly be applied prior to the vehicle wheels engaging the respective wheel engaging arms 30 and 31.

The controlling of the carriage 20 or 21, particularly as controlled by the sensing means 120, is described hereinafter with reference to the schematic electrical control circuit of FIG. 11 and the pneumatic diagram of FIG. 12. Each of the carriages 20 and 21 is controlled by an identical pneumatic system, as illustrated in FIG. 12. A plurality of mechanically operated control switches LS2 and LS4 and a valve E, FIG. 12, are adapted to be operated by suitable cams secured to the respective guide rails 23 and 24, FIG. 8, in the manner to be fully described hereinafter. The cams on the guide rails 23 and 24 are rotated into the same plane in FIG. 8 for purposes of facilitating description of their operation.

To facilitate a description of the controlling means for the carriages 20 and 21, it is assumed that the respective carriages 20 and 21 are in their initial positions as illustrated in full lines in FIG. 1 prior to the detection of a car wheel by the sensing means 120 on the carriages 20 and 21. Movement of a car wheel into engagement with the long flexible finger elements 122 operates the microswitch 123 to close the respective microswitch contacts LS5, FIG. 11. Further movement of the car wheel into engagement with the now extended wheel arms 30 and 31 provides sufficient propelling force to move the carriages 20 and 21 forwardly.

When carriages 20 and 21 are in their initial or home position, as illustrated in FIG. 1, the air motors 95 for driving the carriages 20 and 21 have air under pressure applied thereto so that only a slight force is needed to permit the air motor to rotate and provide supplementary force for moving the carriage rightwardly, as viewed in FIG. 1. In fact, it is preferred that the air motors 95 provide about 98 percent of the force needed to continue the movement of the carriages once the initial inertia of the carriages is overcome. Thereafter, approximately 2 percent of the force for sliding the carriages is provided through the vehicle wheels by the conveyor mechanism.

Forward motion of the respective carriages 20 and 21 is sensed by limit switches LS1, FIG. 10, which close their respective contacts LS1–1 to complete the electrical circuit to energize the forward solenoids 132 for valves B, FIG. 12, which controls the movement of the brush slide units 34 and 35. With valves B in their lefthand positions, FIG. 12, air flows through a regulator 136 to cylinder 74 to drive its piston and connecting rod 78 outwardly to force the brush slide units 34 and 35 outwardly to engage the wheels. A pilot line 140 monitors the pressure in lines 133 and 200 from valve B and pilot valves 138 and 139 connected to pilot line 140 controls the water and steam flow. An increase in pressure in pilot line 140 actuates these water and steam valves 138 and 139 and causes water and steam to be ejected through the respective nozzles W and S., FIG. 6. The water and steam valves 138 and 139 are spring biased valves which turn off when the pressure drops below a predetermined amount in common pilot line 140.

The limit switch LS1 which senses the movement of its carriage 20 or 21 by the wheels is actuated by a rotary switch arm 142, FIG. 10, mounted on a supporting shaft 143 which in turn is threaded into the end of the idler sprocket supporting shaft 110, FIG. 7. The supporting shaft 143 has an enlarged block 144, FIG. 9, secured to its outer end. A compression spring 145 is mounted on the shaft 143 and is seated on block 144 to exert a force on collar 146 of the switch arm 142.

The switch arm collar 146 is biased leftwardly, as viewed in FIG. 9, to engage its end surface 150 against a mating surface 151 on the idler shaft 110. The surfaces 150 and 151 serve as clutching means to cause rotation of the collar 146 and switch arm 142 to move the switch arm 142 in a clockwise direction, as seen in FIG. 10, to actuate the LS1 switch to its closed position. When the idler 110 rotates in an opposite direction during the reverse and return movement of the carriages 20 and 21, the clutching surfaces 150 and 151 cause the contact arms 142 to rotate in the opposite counterclockwise directions to engage stop surfaces 148 at which time the limit switch contacts LS1–1 are open.

The closure of the contacts LS1–1 complete a circuit for brush motors 65 to rotate the respective brushes 54 and 55 while steam and water are being dispensed. The circuit for the brush motor 65 for carriage 20, FIG. 11, is over lead 171, lead 172, normally closed contacts LS4–2, now closed contacts LS1–1, and normally closed contacts 235, brush motor 65 to common return line 180. The circuit for brush motor 65 of carriage 21 is over lead 170, lead 171A, normally closed contacts LS4–2, now closed contacts LS1–1, normally closed contacts 236, brush motor 65, to common return line 180.

The washing operation continues as the carriages 20 and 21 traverse along the guide tubes 23 and 24 until limit switches LS4 on the carriages 20 and 21 engage the reverse cams 158. The limit switches LS4 are single pole, double throw switches, which function to reverse the flow of fluid through the cylinder means 74 to retract the brush slide units 34 and 35 from their wheel washing position. Limit switches LS4 also cause a reversal of flow of air to the air motor 95 to brake the forward movement of the carriage in the forward direction. More specifically, as best seen in FIG. 11, contacts LS4-2 open to break the circuits for solenoids 132 for valves B; and contacts LS4-1 are closed by the reverse cams 158 to energize solenoids 164 of valves B. Thus, fluid under pressure is directed through the righthand side of the valves B to the rod sides of the cylinder means 74 to retract the brush units 34 and 35 within the carriages 20 and 21.

Also the closing of contacts LS4-1 completes circuits to energize the reverse solenoids 168 for the valves A to switch them to their lefthand positions, FIG. 12, wherein air under pressure is directed to reverse rotation of the air motors 95 from its counterclockwise direction, as seen in FIG. 11. The circuit for completing the energization of solenoids 168 for the valves A is from common lead 170, lead 171, the now closed contacts LS4-1, lead 172A, through now closed contacts 174 of switch SS, leads 176 and 175, to the respective coils of the solenoids 168 and to common leads 180.

Solenoids 168 shift the valves A to their lefthand position, FIG. 12, in which high pressure air is directed over line 135A to valve A. The air motors 95 not only serve to brake counterclockwise rotation of motors 95 and forward movement of the carriages 20 and 21, but also to afford a faster return speed for the carriages and sufficient force to drive the carriages rearwardly. To this end, a quick exhaust valve 185 is connected to the motor 95 to exhaust the air to the atmosphere before reaching a speed control arrangement 196 for the motor 95. The speed control arrangement is only effective in the forward driving position for the air motor 95, as will be explained hereinafter.

Also at the terminal position of carriage travel, an additional "in" cam 181, FIG. 8, is provided for contacting a mechanical arm 182, FIG. 8, to mechanically throw the wheel arm valve E to its righthand position, FIG. 12, thereby directing the flow of the fluid to the rod side of the cylinder means 84 for retracting the wheel engaging arms 30 and 31. As the piston rods 90 move inwardly, the arms 30 quickly pivot from their position of engagement with the car wheel into close alignment with the front 43 wall of the housing and frame structure 42, as shown in the full line position of FIG. 6.

Rapid return of the respective carriages 20 and 21 begins and continues until either the sensing means 120 detects the next successive wheels or, if no wheels are present, until the initial position is reached. During the return traverse, an actuating element 188, FIG. 8, for the wheel arm valve E, is engaged by an "out" cam 190 to operate mechanically the valve E to left-hand position, FIG. 12, and thereby reverse the flow of air to cylinder means 84 to pivot outwardly wheel arms 30 and 31 to the wheel engaging positions. The "out" cam 190 is preferably spaced on the guide tubes 23 and 24 to cause pivoting of arms 30 and 31 to their operative positions immediately after carriages 20 and 21 have cleared the previously washed wheels.

Immediately prior to reaching the initial carriage position, limit switches LS4 contact braking cam 192 to reverse the positions of the respective contacts LS4-1 and LS4-2 to the position shown in solid lines in FIG. 11. That is, the contacts LS4-2 become closed and the contacts LS4-1 are opened to break the circuit to the solenoids 168 for the valves A. Simultaneously, limit switches LS2 are actuated by the braking cam to close contacts LS2-1 to complete obvious circuits to the forward solenoids 195 for the respective valves A.

The valves A shift to the right side, FIG. 12, and the fluid under pressure from the inlet lines 135 and 135A is directed over line 135A and through valves A to time controlled valves G, which are normally open. The time controlled valve G by-passes the speed control valve 196, which would reduce the air pressure, and allow high pressure air to enter the forward side of the motor 95 through one side of quick exhaust valve 185. Thus, braking action is accomplished by the full force of the higher air pressure on the forward side of the motors 95.

The valve G is controlled by a variable metering orifice 198 in the pilot line 199 from valve A to the valve G. After a predetermined amount of time as controlled by a variable orifice 198, the spring force of valve G is sufficient to shift its spool to its righthand or closed position. The valve G is so adjusted that the total time that the valve G is open is no longer than it takes to stop a carriage 20 or 21. If the valve G did not close, the carriage could change its direction of movement and begin to recycle itself. The carriages 20 and 21 are now stopped at their initial position and are prepared for engagement by the wheels of a vehicle. While the carriages 20 and 21 remain stationary, air under pressure from the common source line 135 being routed through the righthand side of the valve B and over line 200 to the speed control valve 196 and through air motors 95 to afford approximately 98 percent of the force needed to move a carriage 20 or 21. The speed control valve 196 is adjusted in the field so that only a slight force, approximately 2 percent of the total force is required to move the carriages 20 and 21 forwardly. Thus, the carriages 20 and 21 remain stationary and await the arrival of the next wheels.

The above described action of the braking cam 192 at the initial position is applicable for the longer wheel base cars or for long spacing between successive wheels of successive vehicles. However, for a shorter wheel base car, the sensing means 120 will detect the rear wheels on its return traverse prior to returning to its initial starting position. In this event, the sensing means 120 actuates the limit switches LS5 to close the respective contacts LS5-1, FIG. 11, to provide parallel circuits over leads 202 and 202A to energize the forward or breaking solenoids 195 of the valves A. The valves A shift to the righthand position and direct high pressure air through the valves G and quick exhaust valves 185 to the forward sides of the air motors 95 to cause braking of the respective carriages 20 and 21. The amount of time of application of the full pressure for the braking operation is controlled by the valve G as set by the orifice regulator 198. Engagement of the wheel sensing arms 30 and 31 and closure of limit switch contacts LS1-1 cause the brush slide units 34 and 35 to move outwardly. The brush motors 65 are energized to rotate the brushes and the water and steam are ejected from the nozzles S and W, respectively, to wash the wheels.

It is preferred practice that the carriages stop prior to the movement of the car wheel through the distance between the sensing means 120 and the wheel arm 30 or 31. The stopping of the carriage 20 or 21 within this distance between the sensing means 120 and wheel arm 30 or 31 avoids engagement of the carriage moving in one direction and the vehicle wheel moving in the other direction, particularly for short wheel base vehicles.

If for some reason an operator wishes to disable the units, the operator operates switch SS, FIG. 11, which causes the cylinder pistons 78 to retract the brush slide units 34 and 35 and simultaneously shut off the water and steam valves 138 and 139. Operation of switch SS completes circuits for solenoids 164 of the valves B over a circuit as follows: input lead 225, lead 226, lead 227, through now closed contacts 228 of the selector switch SS, over lead 172A, to the reverse solenoid coil 164 of the valve B for the carriage 20 and over a lead 230 to the solenoid 164 for the valve B of carriage 21. As will be appreciated from the hereinbefore explanation of FIG. 12, the valve B is shifted to direct high pressure fluid to the rod side of the cylinder 74 and respective carriages to retract the brush slide units 34 and 35. Simultaneously, the pilot lines 140 for the water and steam valves 138 and 139 sense the drop of pressure and their respective springs close the valves 138 and 139 shutting off the water and steam.

From the foregoing, it will be seen that the wheel washing carriages are controlled to detect the oncoming wheels, brake the carriage in its reverse movement and begin a wheel washing operation. Also, the braking force is reduced and the carriages are conditioned for forward movement under a light propelling force from the wheels.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. In a wheel washing apparatus for washing wheels of vehicles moving through a car wash station, a pair of opposed wheel washing carriages disposed for movement beside a vehicle, means on said carriages for washing the wheels of the vehicle as it moves, means to guide said wheel washing carriages along a path of movement between an initial position and a terminal position, driving means for driving said carriages during a return movement from said terminal position to said initial position, sensing means for sensing a pair of wheels on a vehicle during return movement of said carriages by said driving means, and control means operated by said sensing means for disabling said driving means from driving said carriage toward said initial position and for braking said carriages against continued movement toward said initial station.

2. In a wheel washing apparatus for washing successive pairs of wheels, a pair of opposed wheel washing carriages disposed for movement beside a vehicle moving along a path, means to guide said wheel washing carriages beside said path and between an initial position and a terminal position, driving means for driving said carriages during their return movement from said terminal position to said initial position, sensing means for sensing a succeeding pair of wheels on a vehicle during return movement of said carriages by said driving means, and control means operated by said sensing means for disabling said driving means from driving said carriage toward said initial position and braking said carriages against continued movement toward said initial station.

3. In a wheel washing apparatus, a pair of opposed wheel washing carriages disposed for movement beside a vehicle while washing the wheels of the vehicle, means to guide said wheel washing carriages between an initial position and a terminal position, means on said carriages engageable with said vehicle wheels to move said carriages toward said terminal position, motor means on said carriages for driving said carriages from said terminal position toward said initial position, and sensing means on said carriages for sensing a succeeding pair of wheels to disable said motor means and to brake the reverse movement of said carriage toward said initial position.

4. In a wheel washing apparatus for washing wheels of vehicles, opposed carriages carrying wheel engaging brushes, reversible motor means providing a portion of the propelling force to move said cariages from an initial position to a forward terminal position, said motor means providing sufficient propelling force to return the carriages from said terminal position, sensing means for sensing wheels during return movement of said carriages by said reversible motor means, and control means operable by said sensing means to reverse said motor means to brake the movement of said carriage to said initial position and to condition said carriages for forward movement by imparting said portion of said propelling force to said carriages.

5. In a wheel washing apparatus for washing wheels of vehicles, opposed cariages carrying wheel engaging brushes, reversible motor means providing a portion of the propelling force to move said carriages from an initial position to a terminal position, said motor means providing sufficient propelling force to return the carriages from said terminal position, sensing means for sensing a set of wheels during return movement of said carriages by said reversible motor means, control means operable by said sensing means to reverse said motor means to brake the movement of said carriages to said initial position and to condition said carriages for forward movement by imparting said portion of said propelling force to said carriages, wheel engaging arms on said carriages for engaging said wheels whereby said wheels provide a portion of the propelling force for moving said carriages toward said terminal positions, actuating means at said terminal position for reversing said motor means to return said carriage means, and means at said terminal position for reversing the motor means to brake the forward movement of said carriages by said reversible motor means.

6. Wheel washing apparatus for vehicle wheels comprising: a pair of opposed wheel washing carriages disposed for movement beside a vehicle, guiding means for guiding said carriages between an initial starting position and a terminal position, wheel engaging arms on each of said carriages and engageable by said wheels to provide a small portion of the propelling force for moving said carriages forwardly toward said terminal position, reversible air motor means on each of said carriages for driving said carriages between said terminal position and said initial position, said reversible motor means providing a portion of said propelling force to drive said carriages forwardly during a wheel washing operation toward said terminal position, means for reversing said air motor means to brake the forward movement of said carriages at said terminal position and to drive said carriage means towards its initial position, means for reversing the flow of air to said motor means to brake said movement of said carriages at said initial position, sensing means on said carriages for sensing vehicle wheels during the return movement of said carriages and for causing the reverse flow of air to said motor means to brake the return movement of said carriages and to condition said carriages for said forward movement.

7. Wheel washing apparatus for vehicle wheels comprising, a pair of opposed wheel washing carriages disposed for movement beside a vehicle, guiding means for guiding said carriages between an initial starting position and a terminal position, wheel engaging arms on each of said carriages and engageable by said wheels to provide a small portion of the propelling force for moving said carriages forwardly toward said terminal position, reversible air motor means on each of said carriages for driving said carriages between said terminal position and said initial position, said reversible motor means providing a portion of said propelling force to drive said carriages forwardly during a wheel washing operation toward said terminal position, means for reversing said air motor means to brake the forward movement of said carriages at said terminal position and to drive said carriage means towards its initial position, means for reversing the flow of air to said motor means to brake said movement of said carriages at said initial position, sensing means on said carriages including a member engageable with a wheel and switch means operated by said member, control means operable by said switch means of said sensing means for reversing the flow of air to said air motor means to brake the return movement of said carriages, and means to reduce the flow of air to said air motor means to condition said air motor means to provide only a portion of the propelling force needed to move said carriages toward said terminal position.

8. Wheel washing apparatus for vehicles comprising, a pair of opposed wheel washing carriages disposed for movement beside a vehicle, slide means on said carriages carrying rotatable brushes and slidable toward and from said vehicle wheels, guiding means for guiding said carriages between an initial starting position and a terminal position, wheel engaging arms on each of said carriages and engageable by said wheels to provide a small portion of the propelling force for moving said carriages forwardly toward said terminal position, reversible air motor means on each of said carriages for driving said carriages between said terminal position and said initial position, said reversible motor means providing a portion of said propelling force to drive said carriages forwardly during a wheel washing operation toward said terminal position, means for reversing said air motor means to brake the forward movement of said carriages at said terminal position and to drive said carriage means towards its terminal position, means for reversing the flow of air to said motor means to stop said movement of said carriages at said initial position, sensing means on said carriages including a member engageable with a wheel and switch means operable by said member, control means operable by said switch means of said sensing means for reversing the flow of air to said air motor means to brake the return movement of said carriages, means to reduce the flow of air to said motor means to condition said motor means to provide only a portion of the propelling force needed to move said carriages toward said terminal position, and means for sensing carriage movements by said wheels engaging said wheel engaging arms, said last-mentioned means operating said slide means to move into engagement with said wheels.

9. In a wheel washing apparatus for vehicles of various track widths and wheel bases, a pair of opposed wheel washing carriages disposed for movement along side a vehicle, guiding means for guiding said carriages between an initial starting position and a terminal position, wheel engaging arms on each of said carriages and engageable by said wheels to provide a small portion of the propelling force for moving said carriages forwardly toward said terminal position, brush carrying slides on each of said carriages movable outwardly from said carriages to engage the vehicle wheels, reversible air motor means on each of said carriages for driving said carriages between said terminal position and said initial position, said reversible motor means providing a portion of said propelling force to drive said carriages forwardly during a wheel washing operation toward said terminal position, means for reversing said air motor means to brake the forward movement of said carriages at said terminal position and to drive said carriage means towards its initial position, means for reversing the flow of air to said motor means to stop said movement of said carriages at said initial position, sensing means for sensing vehicle wheels during the return movement of said carriages and for causing the reverse flow of air to said motor means to brake the return movement of said carriages and to condition said carriages for said forward movement; and means operable by movement of said carriage in the forwardly direction to actuate said wheel washing slides to engage said wheels and begin a wheel washing operation.

References Cited by the Examiner

UNITED STATES PATENTS 2,957,195 10/1960 Almond.
2,978,718 4/1961 Vani et al.

CHARLES A. WILLMUTH, *Primary Examiner.*

E. L. ROBERTS, *Assistant Examiner.*